June 17, 1930.                     C. F. IRISH                    1,763,707
                          TREE TRANSPLANTING DEVICE
                    Filed April 1, 1929        3 Sheets-Sheet 2
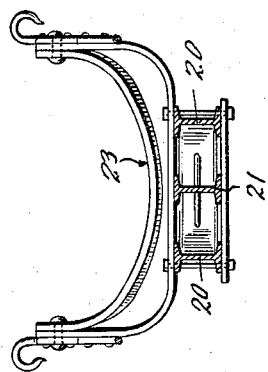
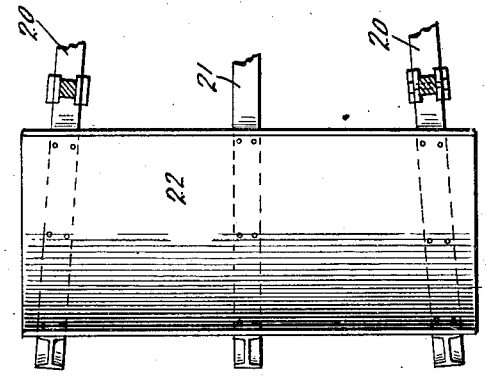
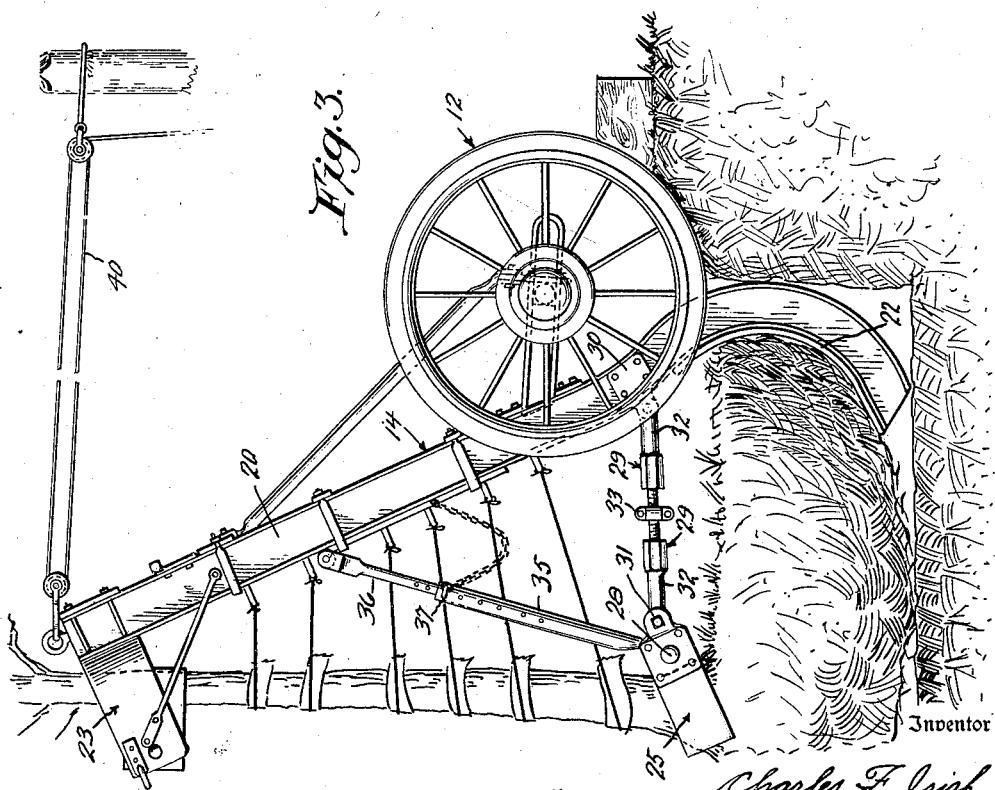

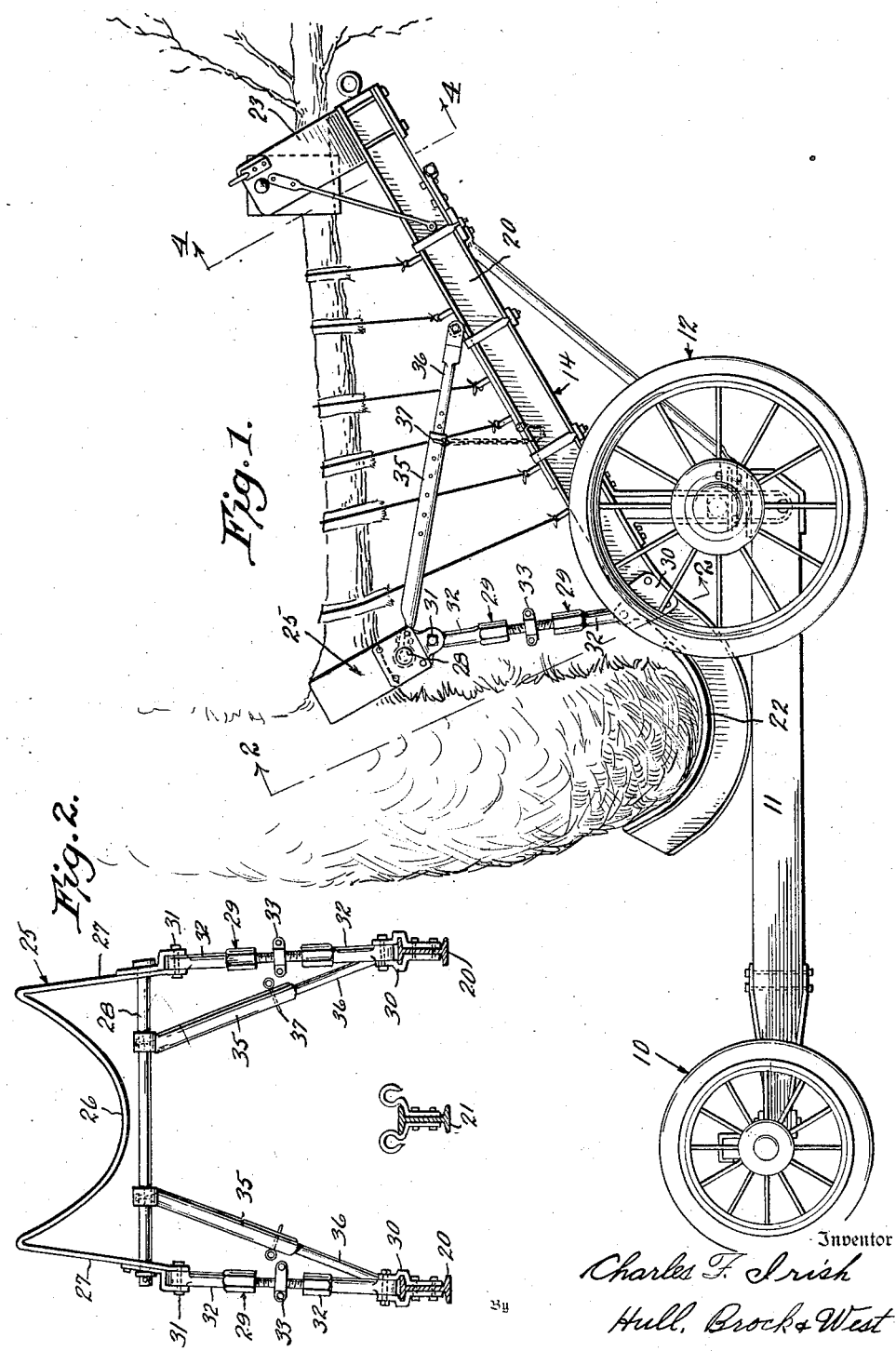

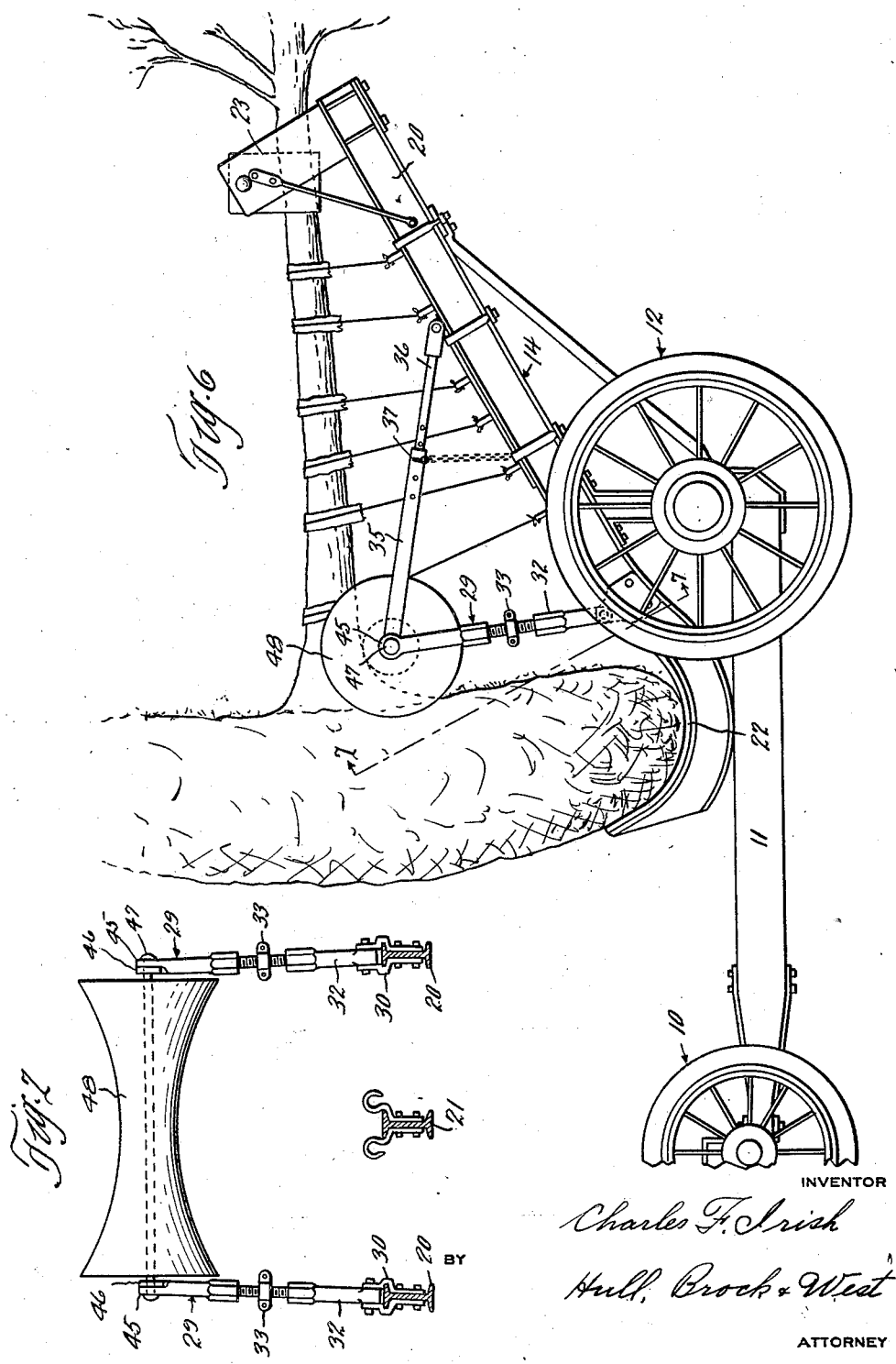

Patented June 17, 1930

1,763,707

UNITED STATES PATENT OFFICE

CHARLES F. IRISH, OF BRATENAHL, OHIO

TREE-TRANSPLANTING DEVICE

Application filed April 1, 1929. Serial No. 351,492.

This invention relates to improvements in tree transporting devices and particularly to improvements on the truck disclosed in my Patent No. 1,532,244, of April 7, 1925.

The object of my invention is to provide means for engaging the trunk of the tree to prevent the same from moving laterally on the carrying cradle, which means may be adjustable to accommodate trees on which the root masses are of different diameters.

A further object is to provide the tree carrying truck with means to which the ropes or other fastening members for the tree may be secured.

In the accompanying drawings, Fig. 1 is a side elevation of the device showing a tree held thereon for transportation; Fig. 2 is a rear view of the front saddle structure which prevents lateral movement of the tree on the cradle; Fig. 3 is a side elevation of the rear truck in position to lift a tree from the ground; Fig. 4 is a rear elevation of the rear saddle which carries the top of the tree; and Fig. 5 is a plan view of the cradle; Fig. 6 is a side elevation similar to Fig. 1 showing a modified form of saddle and Fig. 7 is a rear elevation of the saddle on line 7—7 of Fig. 6.

The running gear of the tree transporting truck herein disclosed is substantially the same as the one disclosed in my patent above referred to including a front axle and wheel assembly pivoted to the reach 11, and a rear axle assembly 12 detachably secured to the rear end of the reach 11. Carried by the rear axle is the tree carrying frame 14 which includes side beams 20 and a central beam 21. On the one end of the frame 14 is secured the concave tree carrying cradle 22 and on the opposite end is secured a pivoted saddle 23 adapted to receive the trunk of a tree. The structure above described is the same as disclosed in my Patent No. 1,532,244 to which reference may be made for the details which are not set forth herein since these details form no part of my present invention.

The middle beam 21 of the frame 14 is provided, as best seen centrally of Fig. 2, with a plurality of hooks to which flexible means extending around the tree trunk may be attached.

The root mass of the tree to be transplanted rests in the cradle 22 and the trunk some distance above the base rests in the saddle 23.

It has been found however that in transportation, the three mass where it rests on the cradle may crumble more on one side than the other and will shift in the cradle. Where the tree being transported is large, a relatively slight shifting of the root mass will throw the top end of the tree to one side so far that it is impossible to pass thru a street until the tree is again straighted on the truck which due to the weight of the mass is very difficult.

To prevent the tree from shifting on the cradle, I provide a front saddle 25 which straddles the base of the tree trunk near the root mass.

The saddle 25 in the form herein illustrated comprises a flat iron band bent to provide a U-portion 26 with arms bent back to provide attaching portions 27. A tie bolt 28 extending between the legs 27 prevents the saddle from spreading under a load. The saddle is supported by extensible struts 29 which, when the frame is in the tree transporting position extend upwardly therefrom, with their lower ends pivoted in brackets 30 on the side beams 20 and their top ends attached to the legs 27 of the saddle by bolts 31. The struts 29 are composed of three sections, the end sections 32 being internally threaded to receive an intermediate screw 33 having reverse threads on its opposite ends whereby the struts may be adjusted in length by turning the screws 33.

Two adjustable braces 35 each having one end secured to the tie rod 28 of the saddle 25 and the other end bolted to the side beams 20 hold the saddle on the struts 29, in the desired position relative to the tree holding cradle 22. The braces 35 are each made in two sections, one telescoping within the other, each telescoping part having transverse apertures 36 to receive a pin 37 whereby they may be adjusted to the desired length.

It is obvious that the struts 29 and braces 35 may be made adjustable in length in any known manner without departing from the spirit of my invention, the construction shown and described being merely illustrative.

The saddle 25 is not intended to carry the weight of the root mass and is usually adjusted so that substantially all the weight is carried by the cradle 22, the purpose of the saddle 25 being primarily to prevent lateral swing of the tree in the saddle 23.

The device is used in the same manner as described in my prior patent. After the root mass of the tree has been freed in its pit, the frame 14 is tipped up at the edge thereof so that the cradle 22 engages under the root mass and by means of a rope or other means the trunk of the tree is secured to the saddle 23 (Fig. 3). The saddle 25 is adjusted by means of the struts 29 and braces 35 to engage the tree near its roots. By means of suitable tackle 40, the tree is lifted from its pit, on the frame 14 and pulled to a substantially horizontal position and the rear axle secured to the reach 11 with the cradle portion of the beams resting thereon. If the root mass when pulled to the riding position has crumbled enough so that too much weight is carried by the saddle 25, the struts 29 may be shortened by turning the screws 33. In case lateral adjustment of the cradle 25 is desired, the strut 29 on one side may be shortened and the one on the other side lengthened.

In Figs. 6 and 7 I have illustrated another form of saddle structure which although it is operated in the same manner as the saddle above described has advantages over the former especially in the transportation of large trees. In this form each strut 29 and brace 35 has its upper end flattened as at 45 and 46 respectively and apertured to receive a tie rod 47 on which is journaled a spool member 48. The spool member 48 which constitutes the front saddle to steady the tree on the cradle 22 is materially larger in diameter at its ends 23 than at its center. Since the spool is free to roll on the rod 47 it does not bite into the trunk of the tree when it shifts thereon as the tree is being lifted from the ground, at which time the front saddle carries a considerable amount of the weight.

While I have shown and described a particular embodiment of my invention it is obvious that various changes may be made without departing from the spirit of the invention and the scope of the appended claims.

Having thus described my invention, what I claim is:

1. In a device for transporting trees, a frame member, a cradle secured to one end of said frame adapted to support the root mass of a tree, means at the other end of the frame for supporting the trunk of the tree, struts extending from the top side of said frame, a saddle supported by said struts adjacent the said cradle, said saddle being adapted to receive the trunk of the tree near its root mass to prevent lateral movement thereof, said struts being adjustable in length whereby the saddle may be moved to accommodate trees having root masses of different diameters.

2. In a device for transporting trees, a frame member, a cradle secured to one end of said frame adapted to support the root mass of a tree, means at the other end of the frame for supporting the trunk of the tree, struts extending from the top side of said frame, a saddle supported by said struts adjacent the said cradle, said saddle being adapted to receive the trunk of the tree near its root mass to prevent lateral movement thereof, said struts being adjustable in length whereby the saddle may be moved to accommodate trees having root masses of different diameters, and adjustable brace members extending from said saddle to said frame for holding the same in the desired position relative to said cradle.

3. In a device for transporting trees, a frame member, a cradle secured to one end of said frame adapted to support the root mass of a tree, a saddle on the other end of the frame for holding the trunk of the tree, telescopical struts extending from the top side of said frame, a second saddle supported by said struts adjacent said cradle adapted to receive said trunk near its root mass to prevent lateral shifting of the same on the frame, and telescopical braces extending from said second saddle to said frame for holding said saddle in the desired longitudinally adjusted position relative to said cradle.

In testimony whereof, I hereunto affix my signature.

CHARLES F. IRISH.